(12) United States Patent
Hikichi

(10) Patent No.: US 11,754,953 B2
(45) Date of Patent: Sep. 12, 2023

(54) IMAGE FORMING APPARATUS, CONTROL METHOD FOR THE IMAGE FORMING APPARATUS, AND A STORAGE MEDIUM

(71) Applicant: CANON KABUSHIKI KAISHA, Tokyo (JP)

(72) Inventor: Atsushi Hikichi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/568,231

(22) Filed: Jan. 4, 2022

(65) Prior Publication Data

US 2022/0236679 A1 Jul. 28, 2022

(30) Foreign Application Priority Data

Jan. 22, 2021 (JP) .................................. 2021-008623

(51) Int. Cl.
*G03G 15/00* (2006.01)

(52) U.S. Cl.
CPC .................. *G03G 15/5004* (2013.01)

(58) Field of Classification Search
None
See application file for complete search history.

(56) References Cited

U.S. PATENT DOCUMENTS

2011/0170123 A1* 7/2011 Ito ..................... H04N 1/00885
358/1.9
2020/0117132 A1* 4/2020 Kawajiri ............ G03G 15/5004

FOREIGN PATENT DOCUMENTS

JP 2019164536 A 9/2019

* cited by examiner

*Primary Examiner* — Quana Grainger
(74) *Attorney, Agent, or Firm* — ROSSI, KIMMS & McDOWELL LLP

(57) ABSTRACT

A device of a lower hierarchy in a power supply configuration sets a flag of a non-volatile storage area when the device of the lower hierarchy reset by WDT. In a case where the flag at the time of starting, the device of an upper hierarchy is notified that the device of the lower hierarchy in the power supply configuration is reset. Thus, the device of the upper hierarchy initializes the entire system, and the image forming apparatus can be operated.

12 Claims, 8 Drawing Sheets

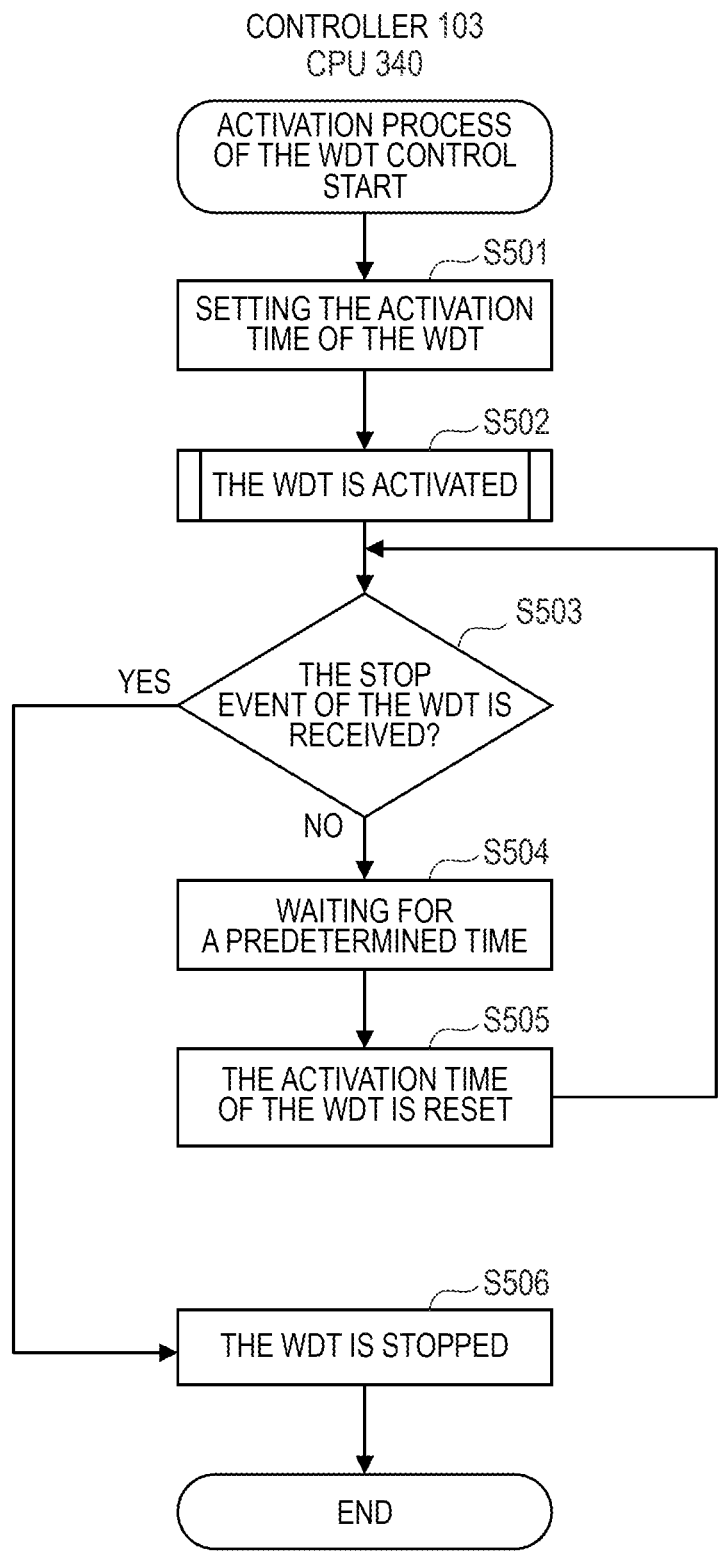

IMAGE FORMING APPARATUS, CONTROL METHOD FOR THE IMAGE FORMING APPARATUS, AND A STORAGE MEDIUM

BACKGROUND OF THE INVENTION

Field of the Invention

The present invention relates to a control method and a storage medium for initializing an image forming apparatus comprising a plurality of components.

Description of the Related Art

In recent years, image forming apparatuses have advanced functions and high expandability such as a server function for holding data as well as copy functions such as copying, scanning, and printing. Therefore, when the system becomes unstable due to a malfunction of a component of a device used for a copying function, a function such as a watchdog timer (WDT) is used to appropriately terminate and restart the system.

Japanese Patent Application Laid-Open No. 2019-164536 shows a method having switching means for receiving an interrupt by the CPU and storing in an external memory that a WDT reset is generated when receiving the interrupt input of the WDT from the own chip or the external chip, and then switching the WDT reset to an output outside of the own chip. However, in the case of Japanese Patent Application Laid-Open No. 2019-164536, since the interrupt can be handled only when the CPU is operating, the interrupt is not handled when the system hangs.

SUMMARY OF THE INVENTION

The WDT interrupts may be applied in a variety of cases. The cases and solutions are exemplified in the following.

(Case 1) In the image forming apparatus equipped with suspending or resuming functions for saving power, in a case where a malfunction occurs in the CPU or peripheral devices of a controller board mounted on the image forming apparatus during resume processing of the image forming apparatus, and the resume processing of the image forming apparatus cannot be restored.

(Solution for case 1) Recovery operations such as checking boards and retries are executed by resetting with the WDT interrupts.

(Case 2) In the image forming apparatus equipped with a scanner device, in a case where a malfunction occurs in motors or optical components of the scanner device, the optical components do not move to a designated position, and a knocking sound is heard.

(Solution for case 2) Based on detecting the failure to move to the designated position and the malfunction of the optical detection, the motor is forcibly stopped by resetting with the WDT interrupts.

(Case 3) In the image forming apparatus equipped with a facsimile (FAX) device, in a case where a malfunction occurs in the FAX device and the response of a transmission/reception part is discontinued during communication over a telephone line.

(Solution for case 3) In a case where the telephone line is forcibly disconnected by resetting with the WDT interrupt.

As described above, even if a malfunction may occur in various devices, the target device can be appropriately terminated by the WDT interrupt processing.

In general, the power supply of the target device may be controlled by a certain device, and the target device is reset by the WDT interrupts when a malfunction occurs in the certain device. This configuration ensures the starting order of the power plane controlled by the malfunctioning device when the power is turned on again by resetting with the WDT interrupts. If the WDT interrupts reset not only the device whose power is controlled by the malfunctioning device but also the device whose power is not controlled by the malfunctioning device, the devices may be damaged by generating reverse current or the like due to an incorrect starting order of the power plane.

In addition, it may be difficult for the controller to constantly monitor the state of the device whose power is not controlled by the malfunctioning device as well as the state of the device whose power is controlled by the malfunctioning device.

For the above reasons, in the conventional high-functional image forming apparatus, the controller has a high function and it is more efficient to centrally control the entire power supply. Hereinafter, the conventional image forming apparatus including a high-functional controller will be described.

Conventional Example (Advanced Controller)

(Configuration of the Power Supply)

FIG. 7 shows a configuration of the controller 103 controlling the power supply in the prior art, the controller 103 having a high function and occupying a large proportion of the entire control. In the image forming apparatus 101, when a power switch 110 is pressed, a power control part of the controller 103 detects pressing the power switch 110 and supplies power to a CPU 340 of the controller 103. The CPU 340 controls the power switch P410 to supply power to a printer 104 and the CPU 320 of the printer 104. Similarly, the CPU 340 controls the power switch Q411 to supply power to a scanner device 102, and controls the power switch R412 to supply power to a FAX device 107. There are a hierarchy 1 (420) and a hierarchy 2 (421) in the conventional power supply structure of the image forming apparatus 101. The hierarchy 1 (420) includes the hierarchy 2 (421). In the hierarchy 2 (421), the printer device 104, the scanner device 102, and the FAX device 107 can individually reset and control the power supply. Further, in the hierarchy 1 (420), the controller 103 can reset or control the power supply devices in the hierarchy 2 (421) included in the hierarchy 1 (420).

(WDT Control Processing)

FIG. 8 shows a flowchart illustrating the startup processing of the WDT control with the configuration of the conventional power supply (FIG. 7). This flowchart starts when a malfunction occurs in a device monitored by the CPU 340. In step S501, the CPU 340 sets an activation time which is a set time of the countdown of the WDT. In step S502, the WDT is activated. Details of step S502 will be described later. In step S503, the CPU 340 checks whether or not the stop event of the WDT has been received from the module controlling the device, the stop event of the WDT corresponding to that there is no malfunction in the device activating the WDT. In a case where the stop event is not received (No in S503), the process proceeds to S504. In a case where the stop event is received (Yes in S503), the process proceeds to S506. In step S504, the controller waits for a predetermined time shorter than the activation time of the WDT in this step. In step S505, the activation time of the WDT is reset to extend the countdown time of the WDT. The process returns to step S503 to continue monitoring the stop event of the WDT. On the other hand, in a case where the stop event is received in S503, the WDT is stopped and the processing is terminated without resetting by the WDT in S506.

(Reset Processing)

On the other hand, in a case where the system stalls or the like while monitoring the stop event of the WDT, the WDT is timed up and a reset processing is executed. The reset processing is executed by the controller 103 to the device in the hierarchy 1 (420) including the hierarchy 2 (421). When the CPU 340 of the controller 103 receives the end notification by pressing the power switch 110 or the like, the CPU 340 executes the end processing. First, the controller 103 in the hierarchy 1 (420) and the printer device 104, the scanner device 102, and the FAX device 107 in the hierarchy 2 (421) are reset or turned off by using the power supply control unit of the controller 103 to terminate the termination processing of the image forming apparatus 101. As described above, the image forming apparatus including the high-functional controller can execute the WDT reset processing. However, for example, in a case where the image forming apparatus includes the functions selected carefully based on the printer function, the printer device occupies a large proportion in the image forming apparatus and the signal lines are also small between the controller and the printer device. Therefore, it is more efficient to control the power supply by the controller in the printer device. In such a configuration, the device whose power is not controlled by the controller of the printer device cannot detect that the malfunctioning device or the device whose power is controlled by the controller of the printer has been reset. Therefore, the device whose power is not controlled by the controller of the printer device cannot perform as the image forming apparatus.

In order to solve the above problems, the purpose of the present invention is that when the malfunctioning device is reset by the WDT interrupt to restart the device whose power is controlled by the malfunctioning device, the device whose power is not controlled by the malfunctioning device is notified of the WDT interrupt to properly initialize the whole system.

According to an aspect of the present invention, an information processing apparatus including a plurality of devices comprising: a first control unit controlling a power supply for a first apparatus and watchdog timer; and a second control unit controlling a power supply for a second apparatus different from the first control unit or the first apparatus, wherein the first control unit includes setting means for enabling a flag of non-volatile storage means when the watchdog timer is started, and notification means for notifying the second control unit in a case where the flag of the non-volatile storage means is enabled when the first control unit is activated.

Further features of the present invention will become apparent from the following description of exemplary embodiments with reference to the attached drawings.

BRIEF DESCRIPTION OF THE DRAWINGS

FIG. 8 is a flowchart illustrating the WDT control of the conventional image forming apparatus.

DESCRIPTION OF THE EMBODIMENTS

An embodiment of the present invention will be described below with reference to the drawings.

System Configuration

Figure 1:
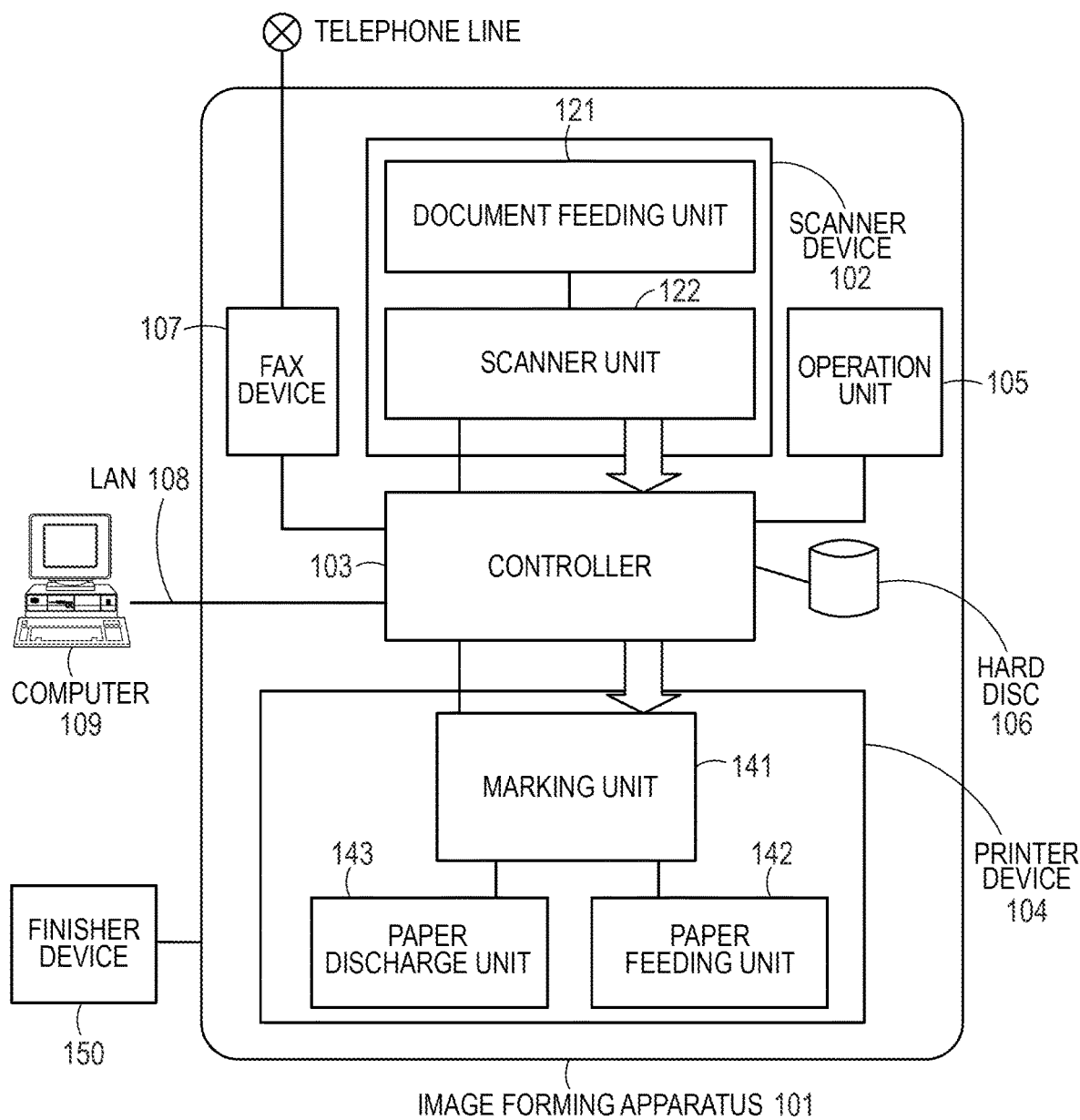
FIG. 1 is an overall view illustrating a configuration of an image forming apparatus.

FIG. 1 is a block diagram illustrating a configuration of an image forming system according to the present embodiment. This example is a multifunction device (MFP) including a printing function, a scanner function, a data communication function, and the like. In FIG. 1, the image forming apparatus 101 is configured to receive jobs from computer 109 via LAN 108. In FIG. 1, although there is only one computer, two or more computers may be connected.

1. An Image Forming Apparatus

The Overall Configuration of the Image Forming Apparatus

The image forming apparatus 101 includes a scanner device 102, a controller 103, a printer device 104, an operation unit 105, a hard disk 106, and a FAX device 107, and is connected with a finisher device 150. The scanner device 102 optically reads images from a document and converts the read images into digital images. The printer device 104 outputs the digital images to paper devices called papers. The operation unit 105 includes a touch panel and a hard key for receiving a setting for the image forming apparatus from a user and displaying a processing state. The hard disk 106 stores digital images, control programs, and the like. The hard disk 106 may be a non-volatile storage device such as an SSD, an eMMC, or the like. The FAX device 107 transmits and receives digital images to and from a telephone line or the like. Further, the controller 103 is connected to the scanner device 102, the printer device 104, the operation unit 105, the hard disk 106, and the FAX device 107 to collectively control each module and execute jobs on the image forming apparatus 101. The image forming apparatus 101 can also input and output digital images, generate jobs, and instruct devices from the computer 109 via the LAN 108.

The Scanner Device

The scanner device 102 comprises a document feeding unit 121 and a scanner unit 122. the document feeding unit 121 can automatically and sequentially replace a bundle of documents. The scanner unit 122 can optically scan the documents and converting the scanned documents into digital images. The converted image data is transmitted to the controller 103.

The Printer Device

The printer 104 comprises a marking unit 141, a paper feeding unit 142, and a paper discharge unit 143. The paper feeding unit 142 can sequentially feed paper from a paper bundle one by one. The marking unit 141 prints image data on the fed paper. The paper discharge unit 143 discharges the paper after printing.

The Operation Unit

The operation unit 105 comprises an LCD touch panel, a power-saving button, a copy button, a cancel button, a reset button, ten keys, a user-mode key, and the like, to provides a user I/F for operating the image input/output system. These keys include hardware keys, software keys displayed on the LCD, and the like, and the presence of hardware keys is not required.

The Finisher Device

The finisher device 150 performs processing such as paper discharge, sorting, stapling, punching, and cutting on paper devices outputted from the paper discharge unit 143 of the printer device 104 of the image forming device 101.

Further, the image forming apparatus 101 has a switch for controlling the power supply, and when the power supply switch is turned off, the image forming apparatus waits for the termination processing of the software or the hardware, and stops the power supply except for a portion necessary for detecting the on of the power supply switch.

2. Functions of the Image Forming Apparatus

Examples of executable job functions of the image forming apparatus 101 will be described below.

The Copying Function

The image forming apparatus 101 has a copying function of storing images read by the scanner device 102 on the hard disk 106 and simultaneously printing the images by the printer device 104.

The Image Transmission Function

The image forming apparatus 101 has an image transmission function of transmitting images read by the scanner device 102 to the computer 109 via LAN 108.

The Image Storage Function

The image forming apparatus 101 has an image storage function for storing images read by the scanner device 102 on the hard disk 106 and transmitting or printing the images as required.

The Image Printing Function

The image forming apparatus 101 has an image printing function for analyzing, for example, a page description language transmitted from the computer 109 and printing the images by the printer device 104.

3. Entire Configuration of the Controlling Unit

Figure 2:
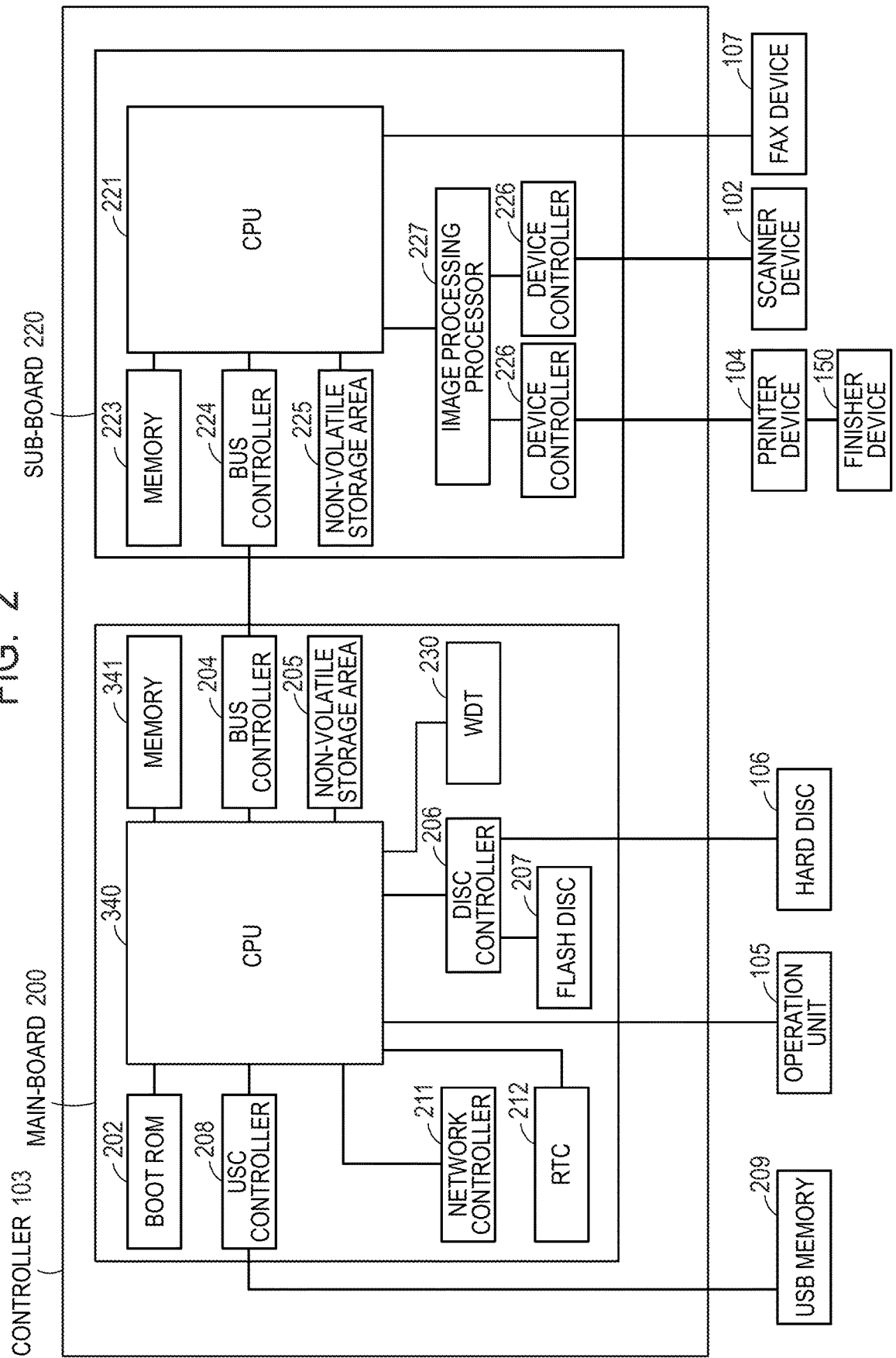
FIG. 2 is a block diagram illustrating a controller.

Next, the block diagram of the controller 103 and the peripheral device will be described with reference to FIG. 2. The controller 103 comprises a main-board 200 and a sub-board 220.

The Main-Board

The main-board 200 is a so-called general-purpose CPU system and includes a CPU 340 controlling the whole board. The main-board 200 also includes a boot ROM 202 including a boot program, a memory 341 used by the CPU 340 as a work memory, a bus controller 204 having a bridge function with an external bus, and a non-volatile memory 205 that retains its contents even when the power supply is cut off. The CPU 340 controls a watchdog timer (WDT) 230 resetting the controller 103.

The main-board 200 further includes a disk controller 206 controlling the storage device, and a flash disk 207. The flash disk 207 is a storage device having a relatively small capacity and made up of semiconductor devices such as an SSD, an eMMC, or the like. The main-board 200 also includes a USB controller 208 or the like capable of controlling the USB, a network controller 211 managing network connection, and a real-time clock (RTC) 212. The main-board 200 is externally connected with a USB memory 209, the operation unit 105, the hard disk 106, and the like.

The Sub-Board

The sub-board 220 includes a relatively small general-purpose CPU system and image processing hardware. The sub-board 220 also includes a CPU 221 controlling the whole board, a memory 223 used by the CPU as a work memory, a bus controller 224 having a bridge function with an external bus, and a non-volatile memory 225 that retains its contents even when the power supply is cut off. The sub-board 220 further includes an image processing processor 227 executing real-time digital image processing and a plurality of device controllers 226. A scanner device 102 and a printer device 104 are connected with the outside of a controller 103 and pass digital image data via the device controller 226. The paper device discharged from the printer device 104 is processed by the finisher device 105. The FAX device 107 is directly controlled by the CPU 221.

Note that this figure is a simplified block diagram. For example, the CPU 340, the CPU 221, and the like include many CPU peripheral hardware such as a chip-set, a bus bridge, a clock generator, and the like. This block diagram is described in a simplified form because it is not necessary for the granularity of the description, and this block configuration does not limit the present invention.

Controller Operation

The operation of the controller 103 will be described with an example of image copying with a paper device.

When a user instructs copying of an image from the operation unit 105, the CPU 340 sends an instruction of reading the image to the scanner device 102 via the CPU 221. The scanner device 102 optically scans a paper document, converts the scanned paper document into digital image data, and inputs the digital image data to the image processing processor 227 via the device controller 226. The image processing processor 227 performs DMA transfer to the memory 223 via the CPU 221 to temporarily store digital image data. When it is confirmed that the memory 223 receives and stores a certain amount or all of the digital image data, the CPU 340 instructs an image output to the printer device 104 via the CPU 221. The CPU 221 notifies the address of the digital image data in the memory 223 to the image processing processor 227. The digital image data in the memory 223 is transmitted to the printer device 104 via the image processing processor 227 and the device controller 226 in accordance with a synchronization signal from the printer device 104. The printer device 104 prints the digital image data on a paper device.

When a plurality of copies is printed, the CPU 340 stores the digital image data in the memory 223 in the hard disk 106. In the second and subsequent parts, the digital image data can be sent from the hard disk 106 or the memory 223 to the printer device 104 without receiving the digital image data from the scanner device 102.

4. A Configuration of the Power Unit

Figure 3:
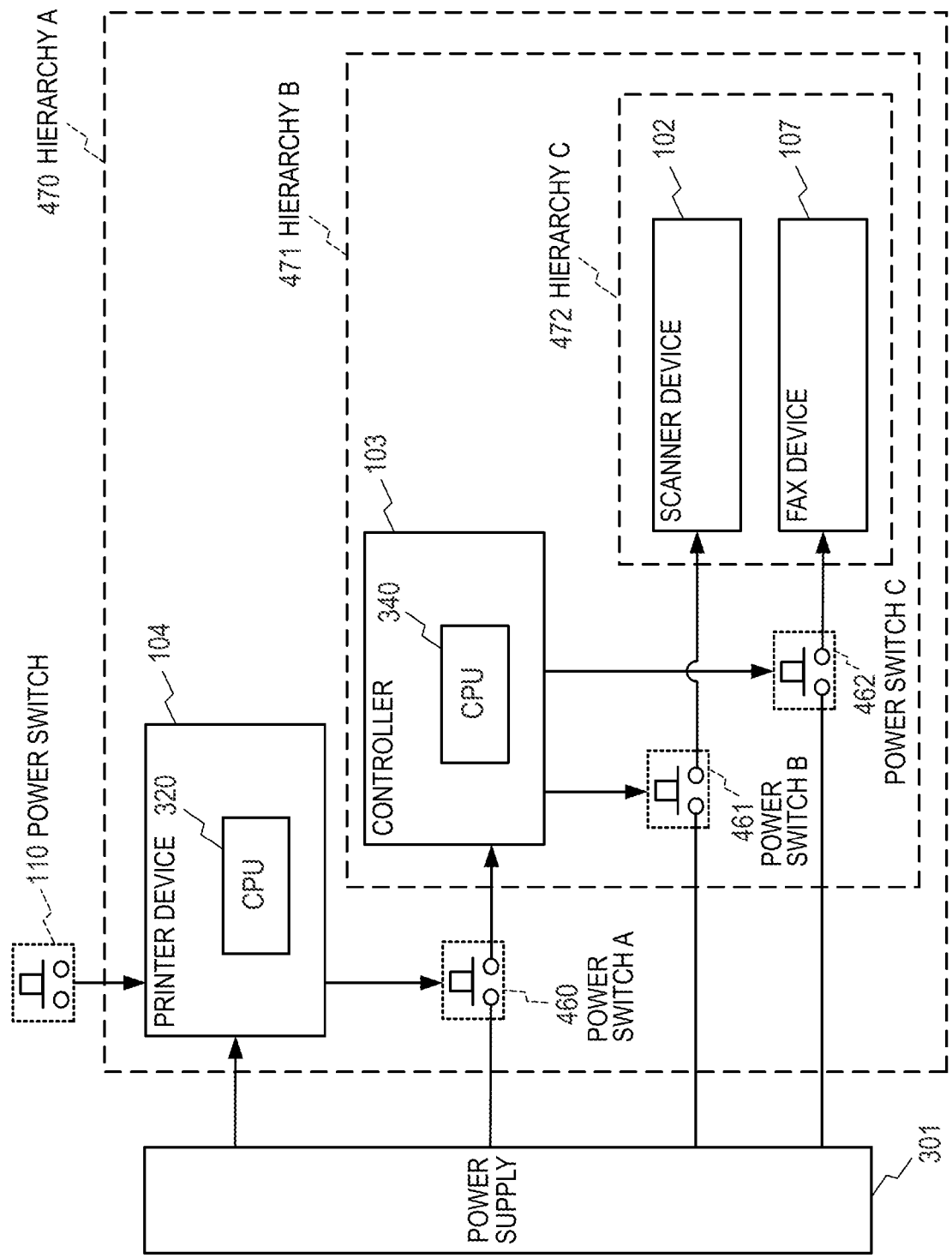
FIG. 3 is a diagram illustrating a power supply configuration of the image forming apparatus according to the exemplary embodiment.

FIG. 3 is a block diagram illustrating the power supply configuration of the image forming apparatus 101 according to the embodiment of the present invention shown in FIG. 1. The controller 103 of the image forming apparatus 101 includes the functions selected carefully. The printer device 104 controls the power supply and many functions in the entire system.

The Power Supply Configuration

In the image forming apparatus 101 shown in FIG. 3, a power supply 301 and a power supply configuration for each apparatus will be described below. In the image forming apparatus 101, when the power switch 110 is pressed, the power control part of the printer device 104 detects pressing the power switch 110 and supplies power to the CPU 320 of the printer device 104. The CPU 320 of the printer device 104 controls the power switch A460 to supply power to the controller 103 and the CPU 340 of the controller 103. Further, the CPU 320 may individually control the marking unit 141 of the printer device 104, the paper feed unit 142, and the paper discharge unit 143 by the power control. However, the description of this configuration is omitted in order to deviate from the purpose of the present application.

Similarly, the CPU 340 of the controller 103 controls the power switch B461 to supply power to the scanner device 102, and controls the power switch C462 to supply power to the FAX device 107.

The configuration of the power supply of the image forming apparatus 101 of the embodiment has a hierarchical structure and includes the hierarchy A470, the hierarchy B471, and the hierarchy C472. The hierarchy A470 includes the hierarchy B471 and the hierarchy B471 includes the hierarchy C472. In the hierarchy C472, the scanner device 102 and the FAX device 107 can individually reset and control the power supply. Further, in the hierarchy B471, the controller 103 can reset and control the power supply of the devices in the hierarchy C472 included in the hierarchy B471. Furthermore, in the hierarchy A470, the printer device 104 can reset and control the power supply of the devices in the hierarchy B471 and the hierarchy C472 included in the hierarchy A470.

Reset

In the configuration described above, when the controller 103 is reset by the WDT, the various registers controlled by the controller 103 are returned to the initial values. Then, the power switch B461 controlling the scanner device 102 is turned OFF/ON, and a power switch C462 controlling the FAX device 107 is turned OFF/ON. In the section in which the power supply falls with time due to the power supply switch OFF/ON, the power OFF section can be guaranteed by H/W (hardware) and S/W (software). However, the description of this configuration is omitted in order to deviate from the purpose of the present application.

The Termination Processing

In the configuration of FIG. 3 according to the present embodiment, the CPU 340 of the controller 103 in the hierarchy B471 notifies the end notification to the CPU 320 of the printer device 104 in the hierarchy A470 when the CPU 340 receives the end notification by pressing the power switch 110 or the like. The CPU 320 of the printer device 104 executes reset processing and power-off processing of the printer device 104 in the hierarchy A470, the controller 103 in the hierarchy B471, and the scanner device 102 and the FAX device 107 in the hierarchy C472, to end the termination processing of the image forming apparatus 101. In the case of normal termination, the WDT flag is deleted and the WDT is stopped.

5. Watch Dog Timer (WDT) Processing

Figure 4:
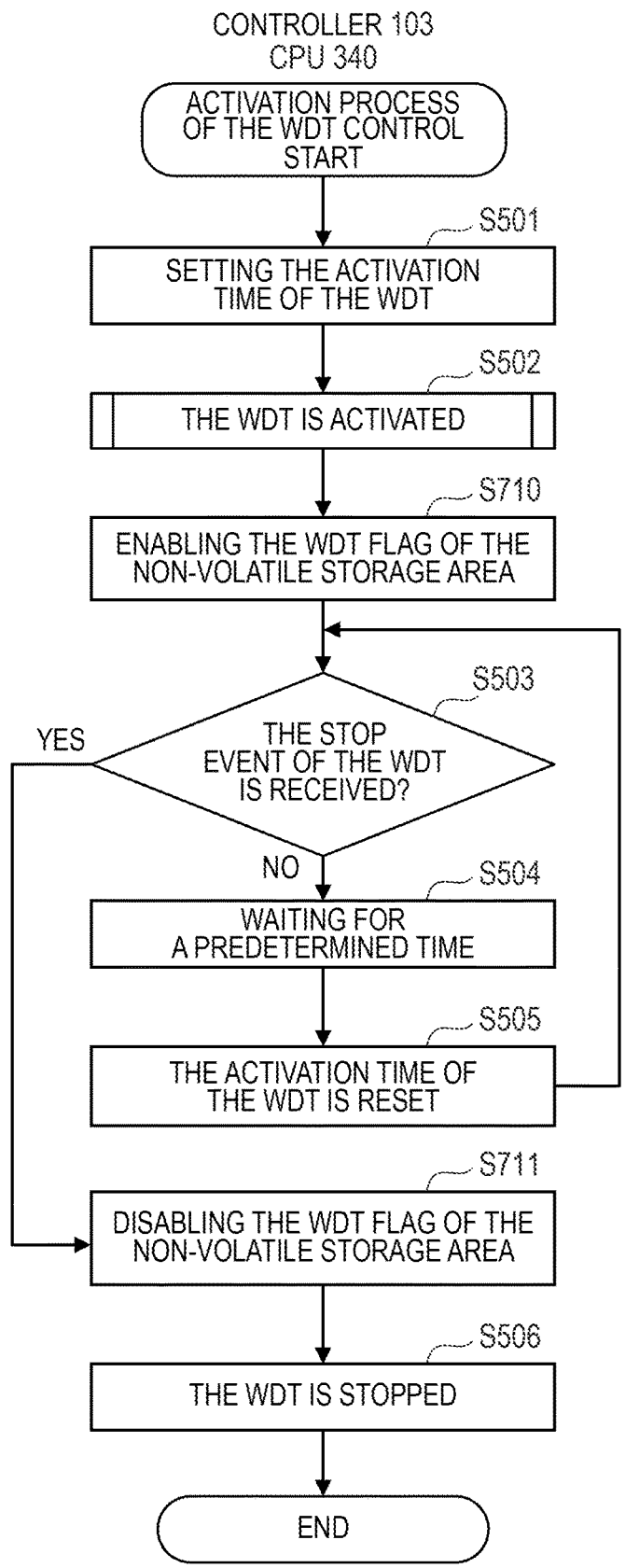
FIG. 4 is a flowchart illustrating the WDT control of the image forming apparatus according to the exemplary embodiment.

In the WDT control process of the present embodiment, the CPU 340 of the controller 103 activates the WDT flag in the non-volatile storage area 205 when starting the WDT. In a case where the WDT flag is enabled in the non-volatile storage area 205 when the WDT times up and the WDT reset is applied, the CPU 320 of the printer device 104 is notified. This configuration is different from the configuration of the conventional example. Referring now to FIG. 4, the flowchart of the activation process of the watchdog timer (WDT) control of this embodiment will be described. The same processing as that of the conventional example shown in FIG. 8 is denoted by the same reference numerals.

This flowchart starts when a malfunction occurs in the device monitored by the CPU 340. First, in step S501, the CPU 340 sets the activation time which is a set time of the countdown of the WDT. In subsequent step S502, the WDT is activated. Details will be described later with reference to FIG. 5. In step S710, the CPU 340 enables the WDT flag of the non-volatile storage area 205. In step S503, the CPU 340 checks whether or not the stop event of the WDT has been received from the module controlling the device, the stop event of the WDT corresponding to that there is no malfunction in the device activating the WDT. In a case where the stop event is not received (No in S503), the process proceeds to S504. In a case where the stop event is received (Yes in S503), the process proceeds to S711. In step S504, the controller waits for a predetermined time shorter than the activation time of the WDT in this step. In step S505, the activation time of the WDT is reset to extend the countdown time of the WDT. The process returns to step S503 to continue monitoring the stop event of the WDT. On the other hand, in a case where in step S711 (Yes in step S503: the stop event is received), the WDT flag of the non-volatile storage area 205 is disabled. The WDT is stopped and the processing is terminated in step S506.

The Reset Processing of the Watchdog Timer (WDT)

Figure 5:
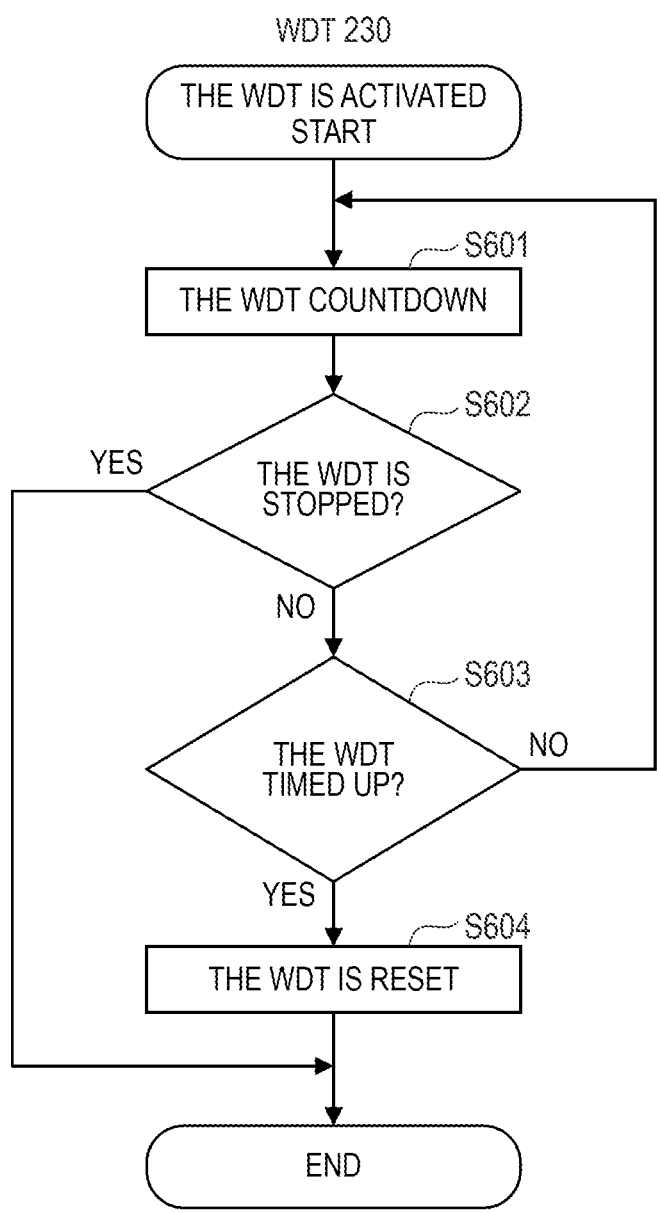
FIG. 5 is a flowchart illustrating the WDT reset process.

Next, the watchdog timer (WDT) reset process in step S502 of the flowchart in FIG. 4 will be described with reference to the flowchart in FIG. 5. First, in step S601, the watchdog timer (WDT) starts counting down from the set value of the WDT activation time based on an input clock or the like. In step S602, the watchdog timer (WDT) determines whether or not the WDT has been stopped by the notification from the module controlling the device causing the WDT to be activated. In a case where the WDT is stopped (Yes in S602), the process ends. In a case where the WDT is not stopped (No in S602), the process proceeds to S603. In step 603, if the value is not written into the register setting the activation time of the WDT within a predetermined time, the WDT counts down the value to 0 and determines that the time is up. In a case where the WDT does not determine that the time is up (the activation time is reset to the register (S505 in FIG. 4)) (No in S603), the process returns to S601 and the WDT continues the countdown. On the other hand, in a case where the WDT determines that time is up (Yes in S603), the process proceeds to S604. In step S604, the WDT generates a WDT signal. By connecting the WDT signal to the reset signal, each device in the hierarchy B (471) is reset.

The method for resetting the devices by using the WDT signal may include various forms such as a method for resetting controller by changing the register value and connecting the register with the reset, a method for changing the register to check by polling from the CPU, and a method for changing the register value and connecting the register with an interrupt to raise the interrupt to the CPU.

The structure of the controller 103 of the image forming apparatus 101 according to the embodiment will be described below. In a case where the non-volatile memory is not included in the main-board 200 as the non-volatile storage area 205 for enabling/disabling the WDT flag, the non-volatile memory can be substituted for the flash disk 207 connected with the disk controller 206 or the HDD 106 outside the controller 103. However, as the distance from the CPU 340 increases, it becomes more difficult to check the WDT flag at an early stage of a startup. The deeper examination is omitted in order to deviate from the purpose of the present application.

The Start Processing

Figure 6:
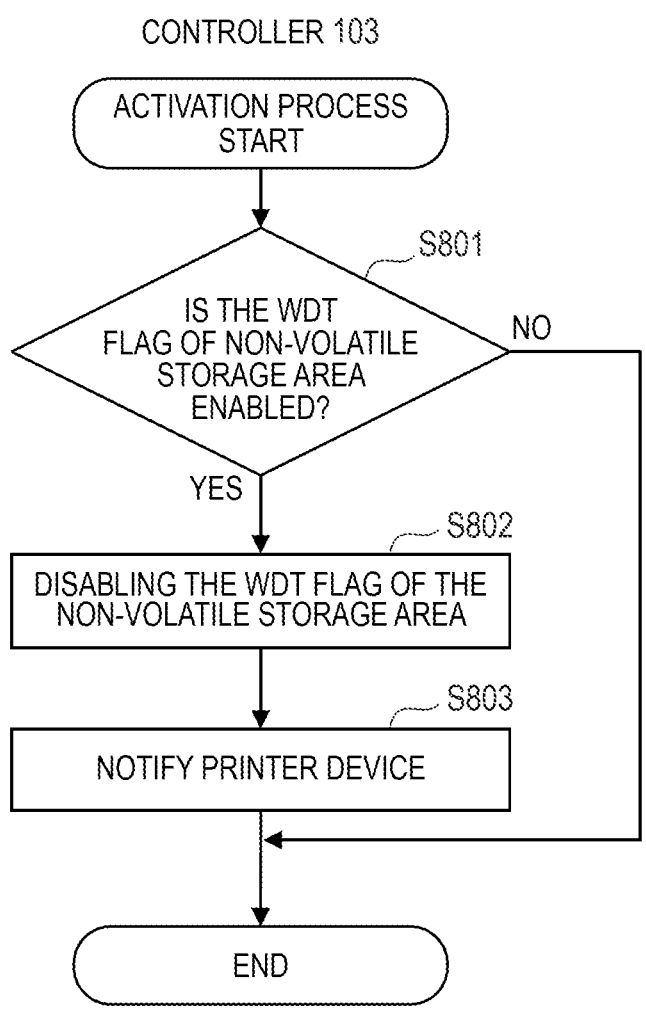
FIG. 6 is a flowchart illustrating the startup processing of the controller according to the exemplary embodiment.
Figure 7:
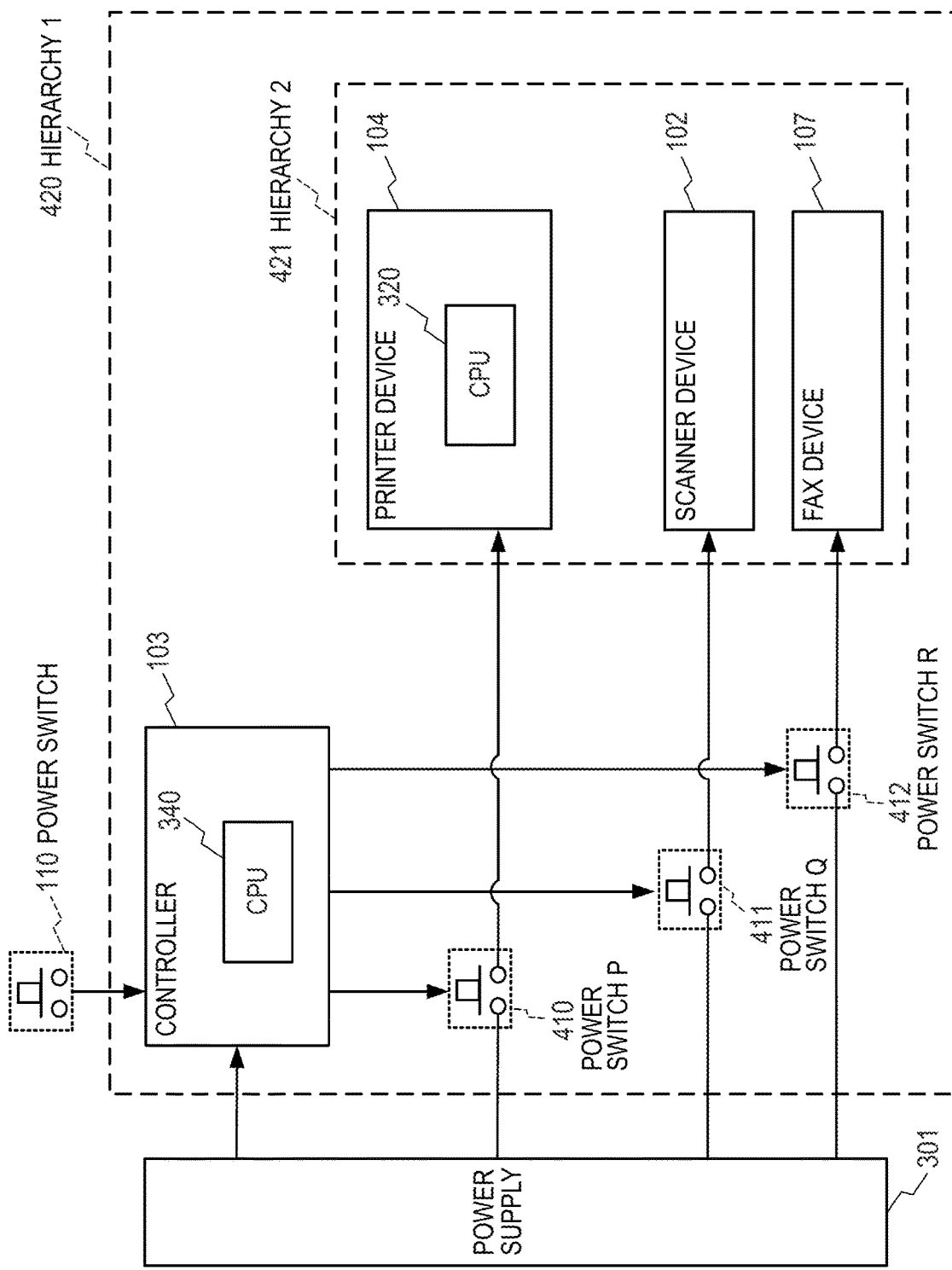
FIG. 7 is a power supply configuration of a conventional image forming apparatus.

With reference to FIG. 6, the starting processing of the controller of this embodiment, which is continued from FIGS. 4 and 5, will be described.

In S503 to S505 of FIG. 4, in a case where the system cannot be controlled due to a system stall and the like, the activation time of the WDT cannot be reset to extend the activation of the WDT. Then, it is determined that the WDT has timed up in S603 of FIG. 8, to reset the WDT in S604. Then, the controller 103 is restarted, and the processing of FIG. 6 is started. This process is also started when the user presses the power switch 110. In step S801, the CPU 340 checks whether or not a flag is set in the non-volatile storage area 205 at the time of the reset or the activation by the power switch 110, the flag indicating that the WDT is being executed. In a case where the WDT execution flag is not set, the CPU 340 executes normal startup (No in S801) and continues startup processing. In a case where the WDT execution flag is set, the CPU determines that the WDT reset is applied (Yes in S801), and proceeds to step S802 to disable the WDT flag. In step S803, the register for signal notification between the controller 103 and the printer device 104 is controlled, and the signal indicating that the WDT flag has been set is notified to the printer device 104. In response to receiving the notification from the CPU 340 of the controller 103, the CPU 320 of the printer device 104 controls each device in the hierarchy A470 to execute initialization processing such as reset and power OFF/ON. Further, in response to the initialization processing, the CPU 340 of the controller 103 controls each device in the hierarchy B471 to execute reset and power OFF/ON.

According to the above embodiment, the image forming apparatus 101 can notify the printer device 104, even if the controller 103 is reset by the WDT, the printer device 104 being the power supply control module in the hierarchy A471 and the controller 103 being the power supply control module in the hierarchy B470. As a result, the printer device 104 can execute control such as resetting and power OFF/ON of each device in the hierarchy A470.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-008623, filed Jan. 22, 2021, which is hereby incorporated by reference herein in its entirety.

What is claimed is:

1. An information processing apparatus including a plurality of devices, the information processing apparatus comprising:
a first control unit configured to control (i) a power supply for a first apparatus and (ii) a power supply for a watchdog timer that resets the first control unit; and
a second control unit configured to control (iii) a power supply for a second apparatus different from both of the first control unit and the first apparatus and (iv) a power supply for the first control unit,
wherein the first control unit is configured to set a flag of a non-volatile storage to enable when the watchdog timer has been started and is configured to notify, when the first control unit is activated, the second control unit in a case where the flag of the non-volatile storage has been enabled.

2. The information processing apparatus according to claim 1, wherein in a case where a stop event of the watchdog timer is received while the watchdog timer is activated, at least the first control unit and the first apparatus controlled by the first control unit are restarted.

3. The information processing apparatus according to claim 1, wherein at least the second control unit, the first control unit controlled by the second control unit, and the second apparatus are restarted in response to the first control unit notifying the second control unit that the flag of the non-volatile storage has been enabled.

4. The information processing apparatus according to claim 1, wherein in a case where a stop event of the watchdog timer is received while the watchdog timer is activated, the first control unit is configured to invalidate the flag of the non-volatile storage.

5. The information processing apparatus according to claim 1, wherein in a case where a malfunction occurs in the first apparatus, the watchdog timer is activated.

6. The information processing apparatus according to claim 1, wherein the first apparatus whose power is controlled by the first control unit is a scanner device or a facsimile device.

7. The information processing apparatus according to claim 1, wherein the second apparatus whose power is controlled by the second control unit is a printer device.

8. The information processing apparatus according to claim 1, wherein the first control unit is configured to invalidate the flag of the non-volatile storage when the first control unit notifies the second control unit that the flag of the non-volatile storage has been enabled.

9. A control method for an information processing apparatus including a plurality of devices, the information processing apparatus comprising a first control unit configured to control (i) a power supply for a first apparatus and (ii) a power supply for a watchdog timer that resets the first control unit, and a second control unit controlling configured to control (iii) a power supply for a second apparatus different from both of the first control unit and the first apparatus and (iv) a power supply for the first control unit, the control method comprising:
setting, by the first control unit, a flag of a non-volatile storage to enable when the watchdog timer has been started, and notifying, when the first control unit is activated, the second control unit in a case where the flag of the non-volatile storage has been enabled.

10. A non-transitory computer-readable storage medium storing a program for causing a computer to execute the control method for the image processing apparatus according to claim 9.

11. The information processing apparatus according to claim 1, wherein the watchdog timer resets the first apparatus when a predetermined time elapses without reception of a stop event after activation.

12. The information processing apparatus according to claim 1, wherein the second control unit resets the second apparatus when the notification is received from the first control unit.

* * * * *